(12) United States Patent
Saichi et al.

(10) Patent No.: US 6,397,470 B1
(45) Date of Patent: Jun. 4, 2002

(54) DYNAMIC PRESSURE BEARING APPARATUS AND METHOD FOR MANUFACTURING THEREOF

(75) Inventors: Masayoshi Saichi; Masato Gomyo, both of Nagano (JP)

(73) Assignee: Sankyo Seiki Mfg. Co., Ltd., Nagano-ken (JP)

( * ) Notice: Subject to any disclaimer, the term of this patent is extended or adjusted under 35 U.S.C. 154(b) by 0 days.

(21) Appl. No.: 09/627,720

(22) Filed: Jul. 28, 2000

(30) Foreign Application Priority Data

Aug. 4, 1999 (JP) .......................................... 11-220979

(51) Int. Cl.$^7$ .............................................. B21D 53/10

(52) U.S. Cl. .............................. 29/898.02; 29/898.07; 29/603.03; 29/598

(58) Field of Search ........................ 29/898.02, 396, 29/598, 603.03, 898.07

(56) References Cited

U.S. PATENT DOCUMENTS

| | | | | |
|---|---|---|---|---|
| 5,647,672 A | * | 7/1997 | Fukutani | |
| 5,743,656 A | * | 4/1998 | Gomyo et al. | |
| 5,822,846 A | * | 10/1998 | Moritan et al. | |
| 5,831,355 A | * | 11/1998 | Oku | |
| 5,964,027 A | * | 10/1999 | Tochiyama | |

* cited by examiner

Primary Examiner—S. Thomas Hughes
Assistant Examiner—Eric Compton
(74) Attorney, Agent, or Firm—Reed Smith LLP

(57) ABSTRACT

A dynamic pressure bearing apparatus has a rotatable shaft to which a hub is mounted, a disk fixed to the hub, a sleeve which supports the rotatable shaft, and a dynamic pressure bearing formed between the rotatable shaft and the sleeve. The rotatable shaft is rotatably supported by the dynamic pressure bearing. The dynamic pressure bearing apparatus is manufactured by integrating the hub and the rotatable shaft by fixing the hub and shaft to each other, processing the disk mounting surface of the hub after integration, such that relative accuracy between the rotatable shaft and the disk mounting surface can be obtained, and then assembling the rotatable shaft to the sleeve.

10 Claims, 7 Drawing Sheets

DYNAMIC PRESSURE BEARING APPARATUS AND METHOD FOR MANUFACTURING THEREOF

BACKGROUND OF THE INVENTION

The present invention relates to a dynamic pressure bearing apparatus applicable to a motor for a hard disk drive as well as a method for manufacturing such dynamic pressure bearing apparatus. More particularly, the present invention related to a dynamic pressure bearing apparatus used to increase the rotational accuracy of a hub to which a rotational body such as a disk is mounted.

As is known, a dynamic pressure bearing apparatus includes a shaft and a sleeve which rotate in relation to each other. As the apparatus starts rotating at a high speed, dynamic pressure is generated by the dynamic pressure generating grooves that are formed, for example, on the bearing surface. The rotor rotates with high accuracy due to the stiffness of the bearing. By applying such an apparatus as a bearing apparatus in a motor for a hard disk drive, high recording density can be obtained. However, further improvement in recording density is demanded and therefore an increase in rotational accuracy is desired.

A conventional method for manufacturing a dynamic pressure bearing apparatus is described with reference to FIGS. 6 and 7. As shown in FIG. 6, a ring-shaped thrust plate 22 is fixed to the outer circumference at the bottom of rotatable shaft 21 to form a shaft assembly by integrating the two parts. Then, rotatable shaft 21 is inserted through the center hole of sleeve 23 from the bottom. Thrust plate 22 fits in a concavity at the bottom of sleeve 23 with a given space. Counter plate 24 is engaged into another concavity having a diameter larger than the previous concavity at the bottom of sleeve 23. Counter plate 24 is fixed to sleeve 23, and an adhesive is used for sealing such that a sleeve assembly is provided.

Rotatable shaft 21 is rotatable in relation to sleeve 23 wherein a bearing assembly is formed by inserting oil as a lubricant fluid between rotatable shaft 21 and sleeve 23. Dynamic pressure generating grooves are formed on at least one of the outer surface of rotatable shaft 21 and the inner surface of sleeve 23. A dynamic pressure bearing is formed by placing the oil between the dynamic pressure generating grooves, rotatable shaft 21 and sleeve 23.

On the other hand, a core assembly is formed by winding drive coil 26 around each of projecting poles of laminated core 25. A center hole of laminated core 25 of the core assembly is engaged to the outer circumference of sleeve 23 of the bearing assembly and is fixed thereto by an adhesive. Oil absorbent fabric 27 is placed on the laminated core from the upper end of rotatable shaft 21 and cover 28 is engaged thereto. As shown in FIG. 7, the laminated core is mounted to the upper surface of sleeve to form a stator assembly.

Further, in a separate process, as shown in FIG. 7, cylindrical rotor magnet 33 is engaged to the inside ceiling of hub 30, with a reversed-cup shape, via seal 32 to form a rotor assembly. Rotor magnet 33 is magnetized, alternating the N and S poles with a given distance, in a circumferential direction. It is fixed to the inner surface of hub 30 with an adhesive or the like. Hub 30 has disk mounting surface 31 which projects as a flange to the outer circumference. The rotor assembly is placed on the top of the stator assembly to form a motor assembly by fixing the top end of rotatable shaft 21 to the center hole hub 30.

The center hole of base 34 is engaged to the outer circumference at the bottom of sleeve 23, forming the motor assembly, and is fixed with an adhesive and the like. Insulator 29 is placed between the stator portion of the motor assembly and base 34. Flexible print wiring substrate 35 is placed at a concavity formed on the bottom surface of base 34. Each drive coil 26 and a feeder circuit are connected by flexible print wiring substrate 35.

A current flow to each drive coil 26 is controlled while detecting the rotational position of rotor magnet 33, causing magnetic attraction / repulsion between rotor magnet 33 and the projecting pole of the stator. As a result, a force is applied to the rotor, which is formed together with rotor magnet 33, in the circumferential direction such that the rotor rotates. Dynamic pressure is generated, by rotation of rotatable-shaft 21 as a part of the rotor, between the outer surface of rotatable shaft 21 and the inner surface of sleeve 23 due to viscous resistant of the oil. Then, rotatable shaft 21 is supported in the radial direction without having its outer surface mechanically contact the inner surface of sleeve 23. Also, a thrust dynamic pressure bearing is formed between thrust plate 22, sleeve 23 and counter plate 24; the thrust load of rotatable shaft 21 is supported without mechanically contacting the other parts.

According to a conventional method for manufacturing a dynamic pressure bearing apparatus as described above, hub 30 and rotatable shaft 21 are assembled to each other at the end of the manufacturing process. Therefore, one may not be able to obtain high accuracy of disk mounting surface 31 of hub 30 for vibration or deviation in the axial direction in relation to the rotational center of rotatable shaft 21. This is due to the space between rotatable shaft 21 and sleeve 23, which is sufficient for generating dynamic pressure; because when hub 30 is fixed to rotatable shaft 21 at the end of the manufacturing process, rotatable shaft 21 may be assembled to hub 30 with leaning by an amount of the space therein.

Also, the length of a shaft in the axial direction tends to be shortened along with a decrease in the thickness of apparatus in recent years. In the case of a short length in the axial direction with a thin bearing, according to the conventional method for manufacturing a dynamic pressure bearing apparatus, sufficient length for connecting hub 30 and rotatable shaft 21 cannot be obtained. This is another reason why it is difficult to provide accuracy of disk mounting surface 31 for vibration in the axial direction.

Further, in the case of a short length in the axial direction with a thin bearing, it is difficult to obtain sufficient length for connecting hub 30 and rotatable shaft 21. As a result, bonding strength is not sufficient, when impact is applied, the product is deformed such that desired characteristics are not obtained.

When accuracy of disk mounting surface 31 for vibration or deviation in the axial direction is not sufficiently obtained, in general, after hub 30 is fixed to rotatable shaft 21, then disk mounting surface 31 of hub 30 is cutting processed to reduce vibration or deviation while hub 30 is rotated. However, resolving the problem of vibration or deviation by cutting while rotating with an outside drive after assembling the dynamic pressure bearing as described above causes shortening of the life of the bearing due to contacts among parts thereof.

OBJECTS AND SUMMARY OF THE INVENTION

It therefore is an object of the present invention to provide a dynamic pressure bearing apparatus and a method for manufacturing thereof in which vibration of a hub can be recognized and controlled in the first stage of an assembly process such that accuracy therein is increased and the yield is increased for a lower cost.

It is a further object to provide a dynamic pressure bearing apparatus and a method for manufacturing thereof in which oil as a lubricant fluid can be easily inserted and oil leakage is minimized.

To achieve the above objects, a dynamic pressure bearing apparatus is provided in which a hub is fixed to a rotatable shaft and a disk mounting surface of the hub is processed, wherein the rotatable shaft is inserted into a sleeve. The apparatus is provided with high accuracy as compared to conventional technology in which the vibration of the hub is adjusted at the end of the assembly process. Yield is improved, and the accuracy is guaranteed in the pre-process so that assembly errors and manufacturing cost can be decreased.

In accordance with aspect of the invention, a space between a hub and the end surface of a sleeve is established larger than the bearing space of the dynamic pressure bearing, and is formed to widen outwardly in relation to the side of the dynamic pressure bearing. Therefore, oil can be readily inserted through the relatively large space to the dynamic pressure bearing. Also, since the space between the hub and the end surface of the sleeve is formed to widen outward, cleaning after insertion of the oil is made easy.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF CERTAIN PREFERRED EMBODIMENTS

The following describes a dynamic pressure bearing apparatus and a method for manufacturing thereof of the present invention in relation to examples of a disk drive apparatus shown in FIGS. 1–5. Configurations of the disk drive apparatus shown in FIGS. 1–4 only indicate a right half thereof in relation to a rotational axis of a motor.

Figure 1:
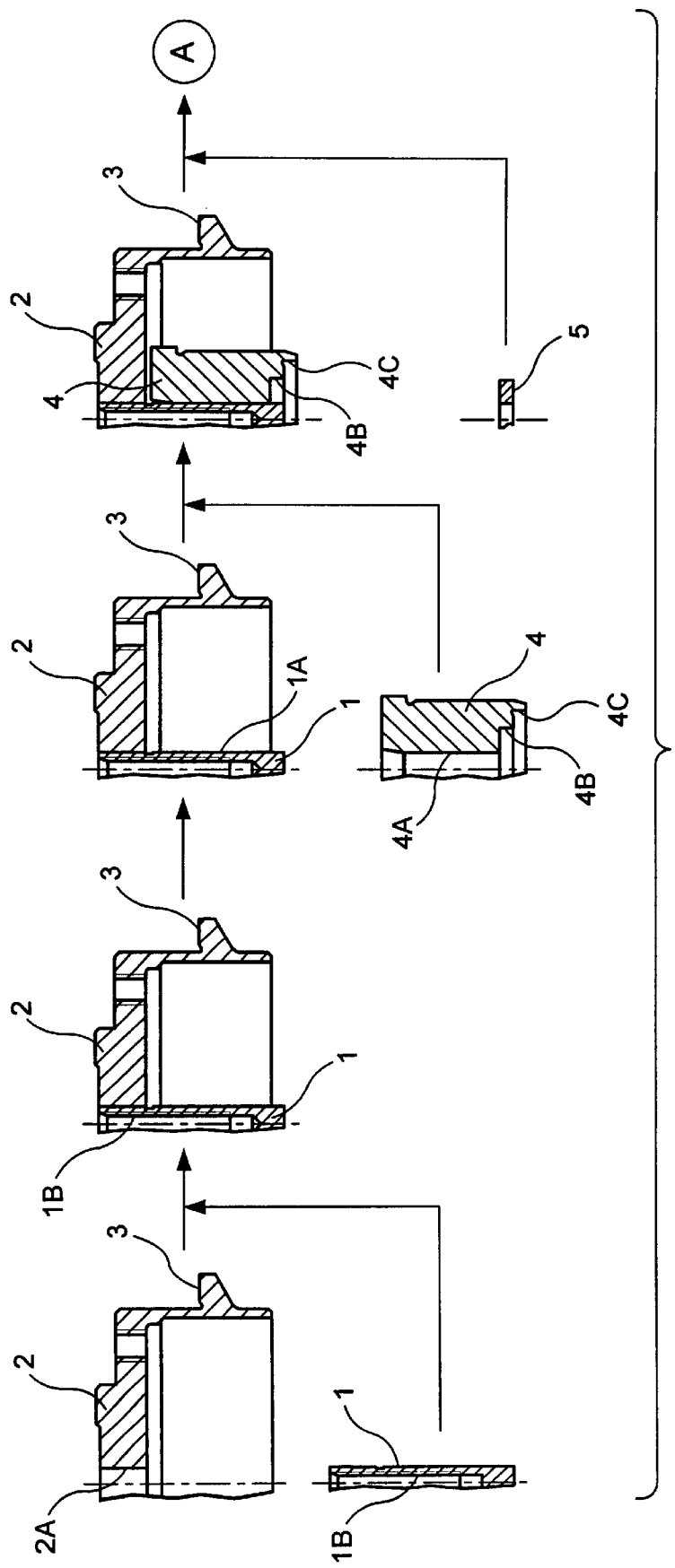
FIGS. 1–4 schematically show a process of manufacturing a dynamic pressure bearing apparatus according to the present invention.

FIG. 1, as the first process, the top end of rotatable shaft 1 with a screw hole at its center is press-fitted into center hole 2A of hub 2 with a shape of a reversed cup wherein the two parts are fixed to each other by laser welding. Hub 2 is for mounting a disk such as a hard disc; the upper surface of a flanging portion, which is integrally formed around the outer circumference of cylindrical body of hub 2, is disk mounting surface 3. It is desirable that rotatable shaft 1 and hub 2 can be firmly fixed to each other only by press fitting. However, the length needed for press fitting tends to decrease as a disk drive apparatus is miniaturized and its thickness is decreased, therefore, it is preferable to apply laser welding or an adhesive for firm fixing.

Then, after rotatable shaft 1 and hub 2 is fixed together, rotatable shaft 1 is chucked to a processing machine; while rotating rotatable shaft 1 together with hub 2, disk mounting surface 3 of hub 2, and the outer surface of hub 2 if necessary, is cutting processed. Herein, this process is to provide high accuracy of disk mounting surface 3 for vibration or deviation in the axial direction when it is rotated around rotatable shaft 1; therefore, extra material or thickness for cutting is formed on disk mounting surface 3 of hub 2 before being fixed to rotatable shaft 1. Rotatable shaft 1 and hub 2 are firmly fixed to each other by press fitting, combined with laser welding and an adhesive if necessary; therefore, the assembly of dimension rotatable shaft 1 and hub 2 is not altered even when hub 2 is processed while rotatable shaft 1 is chucked to the machine, when impact is applied thereto or when resistance is large during the cutting process. In other words, rotatable shaft 1 and hub 2 are firmly fixed without changing their assembly dimension during cutting and impact.

Thereafter, rotatable shaft 1 is inserted into center hole 4A of sleeve 4 downward in FIG. 1. Dynamic pressure generating grooves are formed on at lease one of the inner surface 4A of sleeve 4 and the outer surface 1A of rotatable shaft 1.

Figure 2:
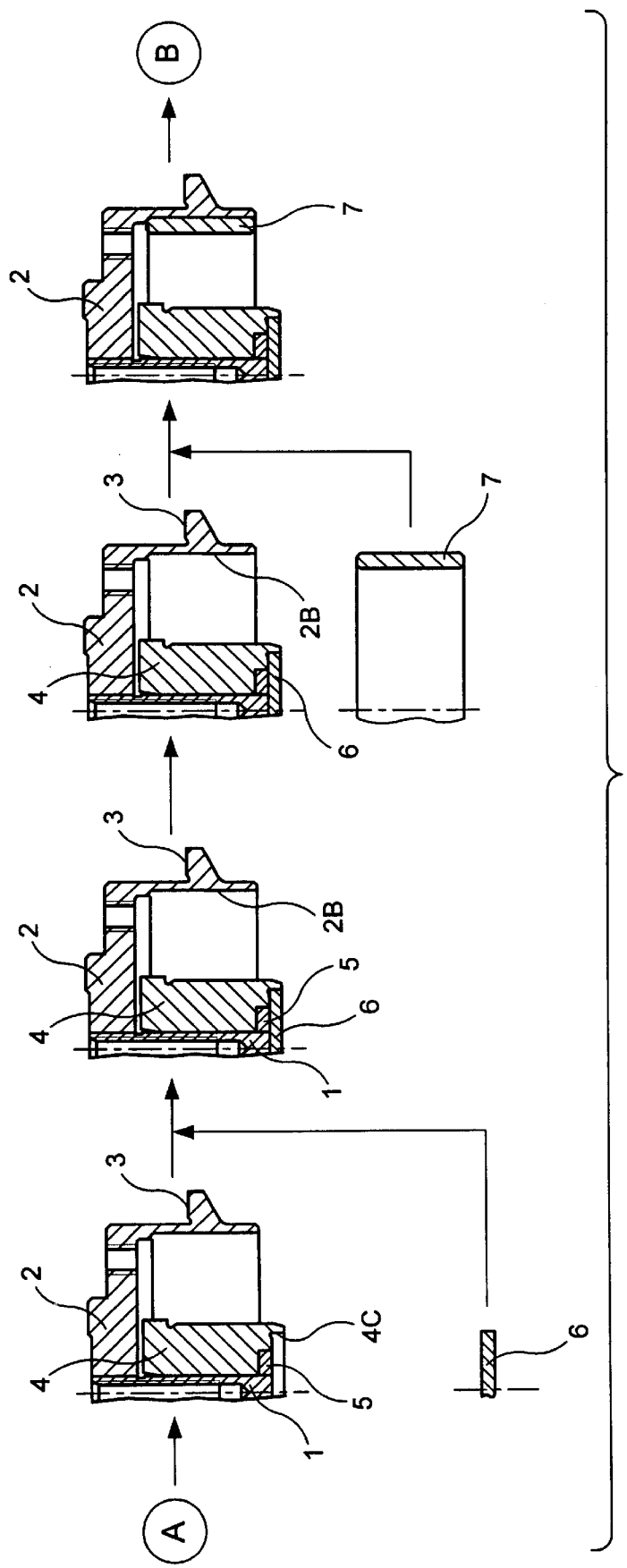

Round concavities 4B, 4C are formed in the vertical direction at the bottom of sleeve 4. Ring-shaped thrust plate 5 is press-fitted to the outer circumference at the bottom of rotatable shaft 1 to fix it thereon. As shown in FIG. 2, thrust plate 5 is engaged onto concavity 4B, located further on sleeve 4, with a small space with sleeve 4. Moreover, counter plate 6, as a lid, is placed in concavity 4C at the lower opening of sleeve 4 to close the opening; it is engaged to concavity 4C at the bottom of sleeve 4. Counter plate is fixed to sleeve 4 with an adhesive; welding can be employed if necessary.

Small spaces are found: between outer surface 1A of rotatable shaft 1 and inner surface 4A of sleeve 4; the bottom of thrust plate 5 and the top of counter plate 6; and the top of thrust plate 5 and the facing surface of sleeve 4. Also, there is a space between the top surface of sleeve 4 and the facing bottom surface of hub 2; this space is larger than the space between outer surface 1A of rotatable shaft 1 and inner surface 4A of sleeve 4. Therefore, Oil as a lubricant fluid is inserted from the space between the top surface of sleeve 4 and the bottom surface of hub 2 such that all the other spaces, between outer surface 1A of rotatable shaft 1 and inner surface 4A of sleeve 4; the bottom of thrust plate 5 and the top of counter plate 6; and the top of thrust plate 5 and the facing surface of sleeve 4, are filled therewith. By filling the spaces with the oil, the following bearings are formed: a radial dynamic pressure bearing in the space between outer surface 1A of rotatable shaft 1 and inner surface 4A of sleeve 4; an upper thrust dynamic pressure bearing in the space between the top of thrust plate 5 and the facing surface of sleeve 4; and a lower thrust plate dynamic pressure bearing in the space between the bottom of thrust plate 5 and the top of counter plate 6. When rotatable shaft 1 is rotated, it is rotatably supported in radial and thrust directions without mechanically contacting sleeve 4.

The oil for dynamic pressure bearings can be inserted (e.g., poured) from the space between the top surface of sleeve 4 and the bottom surface of hub 2 while maintaining the bearing portions to be vacuum or at a negative pressure such that the oil fills the radial and thrust dynamic pressure bearings. After insertion of the oil, any extra oil can be discarded by tilting the whole apparatus, and the oil can be further removed by wiping. Then, cylindrical rotor magnet 7 is engaged to inner wall surface 2B of hub 2 and fixed to hub 2 by an adhesive and the like. Rotor magnet 7 is magnetized in advance for alternating N and S poles with a given distance in the circumferential direction. Bearings and a rotor assembly are completed.

Figure 3:
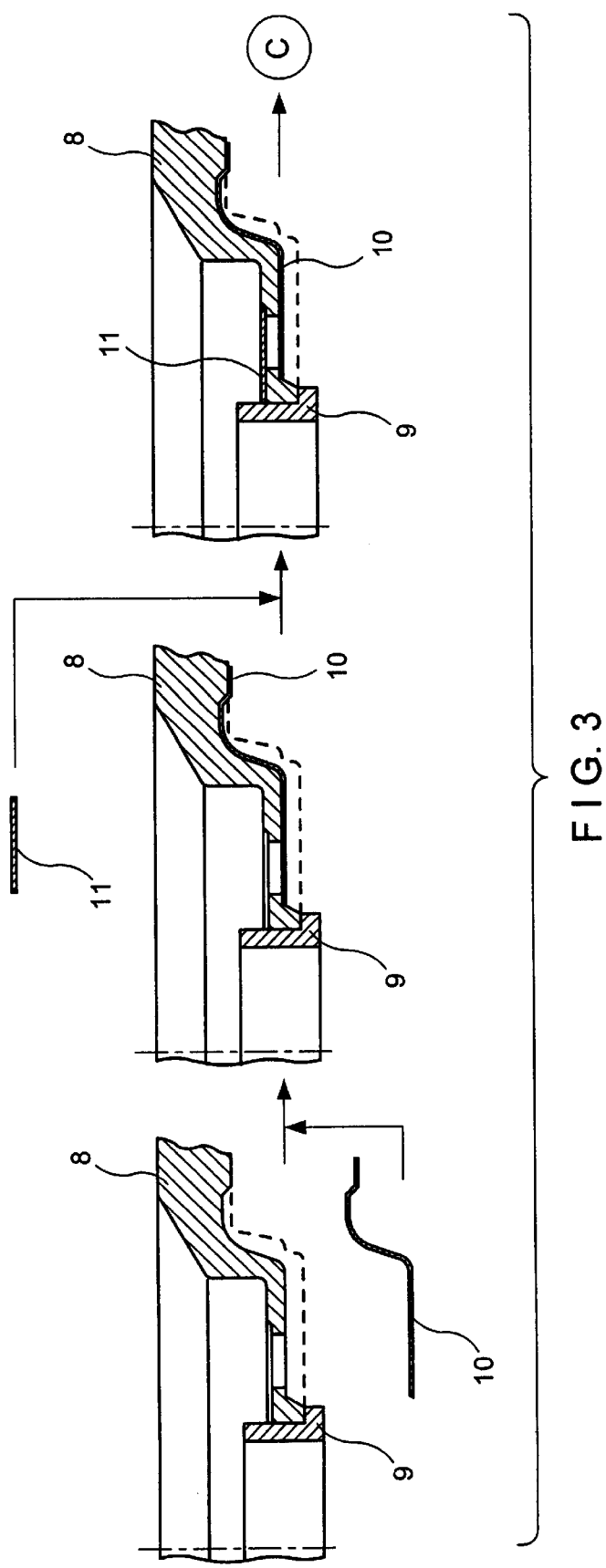

As shown in FIG. 3, approximately cylindrical boss 9 is engaged into a center hole of base 8, and flexible wiring substrate 10 is placed in a groove formed on the bottom surface of base 8. Then, insulator 11 is placed from the top of base 8 to be positioned at the bottom of base 8. A base assembly is completed.

Figure 4:
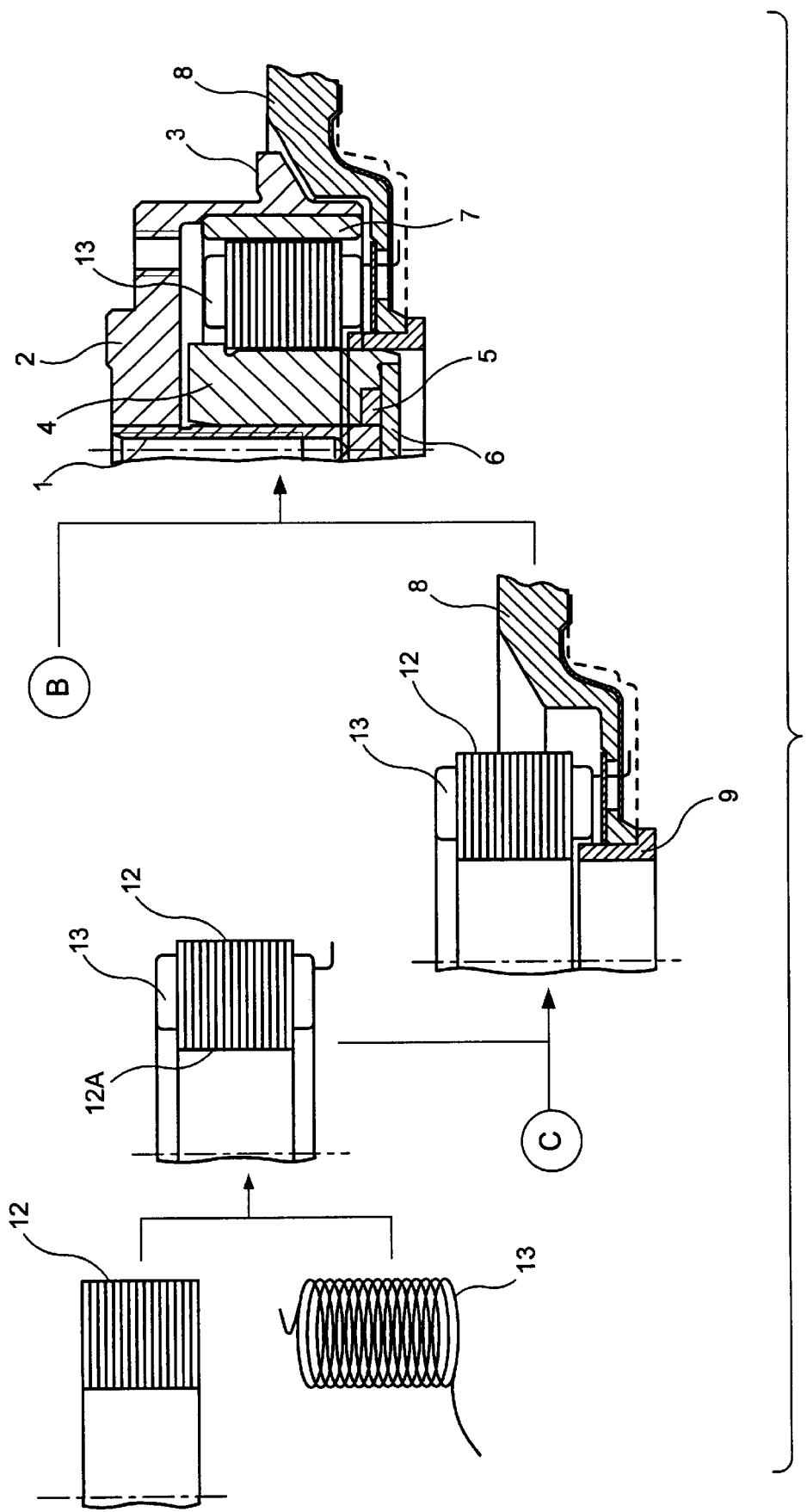

As shown in FIG. 4, a wire is wound around each projecting pole of laminated core 12 as a stator core to form drive coil 13; this is a core winding assembly. The core winding assembly is placed on the top of the base assembly while fitting the center of the two parts. The terminal of drive coil 13 of the core winding assembly is soft-soldered to flexible wiring substrate 10 in a given wiring pattern. Further, extensions and other parts of flexible wiring substrate 10 are sealed with a resin or an adhesive. Base and stator assemblies are completed.

Then, the bearings and the rotor assembly are assembled to the base and stator assemblies. First, sleeve 4 is engaged into center hole 12A of laminated core 12 from the top of the base and stator assemblies; then, sleeve 4 is engaged to the inside of boss 9, providing a motor for hard disk drive. A center hole of a disk (not shown in the figure) is engaged to the cylindrical body of hub 2; one or a plurality of discs are placed on disk mounting surface 3 of with a given spacer. A clamp member is attached to hub 2 using tap hole 1B of rotatable shaft 1 and the like such that the clamp member presses the discs against disk mounting surface 3, hence, the discs can rotate together with hub 2.

Current flows to drive coil 13 is controlled while detecting the rotational position of rotor magnetic 7. As a result, magnetic attraction / repulsion is generated between rotor magnet 7 and the projection poles of stator core 12; the rotor, which is integral with rotor magnet 7, is accelerated in the circumferential direction such that the rotor rotates. By rotation of rotatable shaft 1, which is a part of the rotor, dynamic pressure is generated between outer surface 1A of rotatable shaft 1 and inner surface 4A of sleeve 4 due to viscous resistance of the oil. Consequently, rotatable shaft 1 is supported in the radial direction without mechanical contact of outer surface 1A of rotatable shaft 1 to inner surface 4A of sleeve 4. Also, the thrust dynamic pressure bearing is formed among thrust plate 5, counter plate 6 and sleeve 4, therefore, the thrust load of rotatable shaft 1 is supported without mechanical contact therein.

According to a method for manufacturing a dynamic pressure bearing apparatus as described above, first, hub 2 is fixed to rotatable shaft 1 wherein vibration of hub 2 is noted. Disk mounting surface 3 of hub 2 is processed, followed by insertion rotatable shaft 1 into sleeve 4. As a result, the method provides high accuracy compared to the conventional technology in which vibration of hub 2 is adjusted at the end of the assembly process. Additionally, the yield is improved, and the accuracy is guaranteed in the preprocess; therefore, assembly errors and the manufacturing cost can be decreased. Further, hub 2 is fixed to rotatable shaft 1 before insertion of oil; hence, even when hole 1B, such as a tap hole and the like, is formed is formed on one end of rotatable shaft 1, immersion of the oil to the hole can be prevented.

With a dynamic pressure bearing, a rotatable shaft is treated for oil removal. However, according to a method for manufacturing the above dynamic pressure bearing apparatus, it is not necessary to treat rotatable shaft for oil removal since hub 2 is fixed to rotatable shaft 1. Therefore, generation of dust by press fitting hub 2 to rotatable shaft 1 after oil removal can be minimized.

Figure 5:
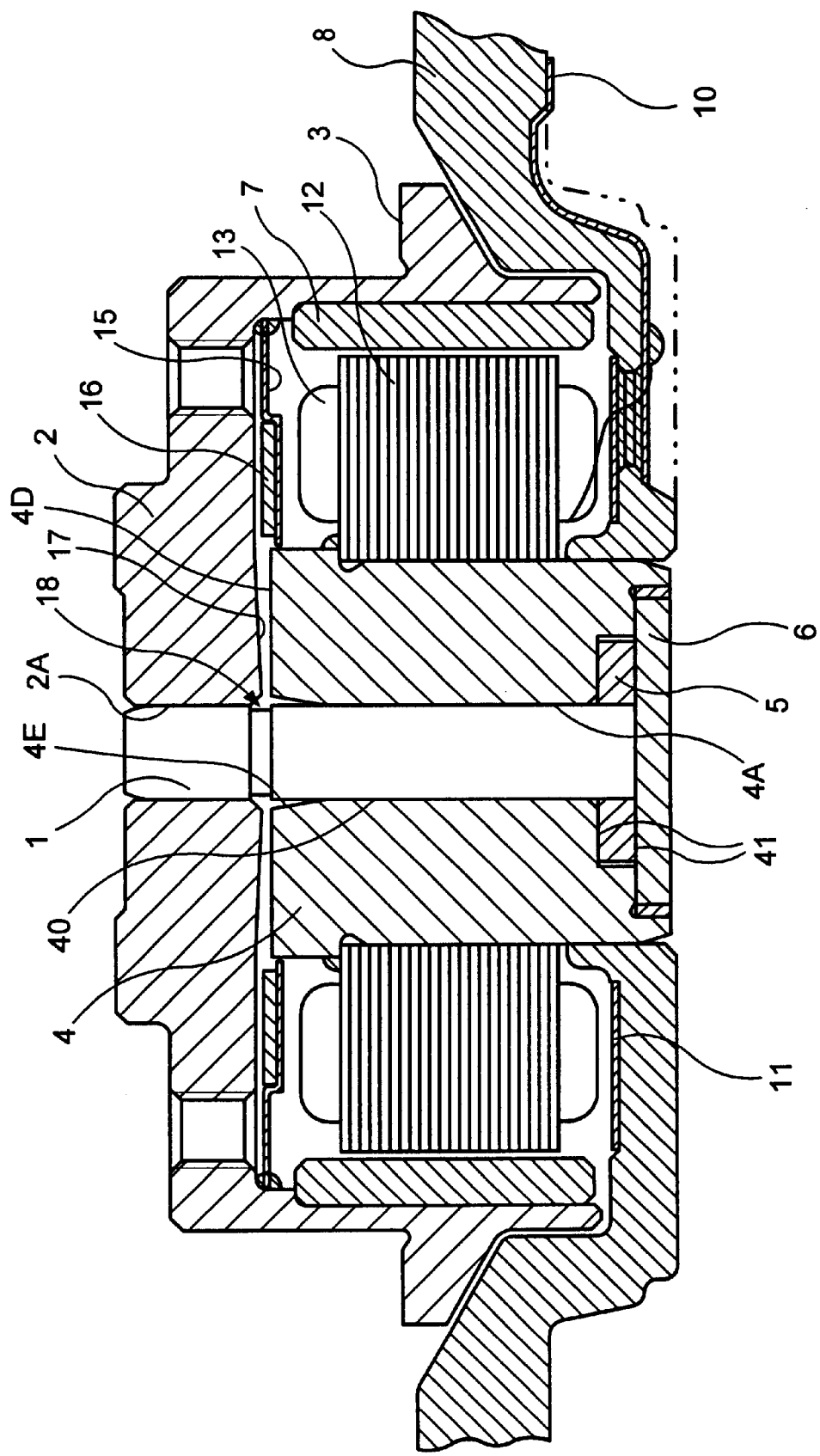
FIG. 5 schematically shows a cross section of an embodiment of a dynamic pressure bearing apparatus according to the present invention.
Figure 6:
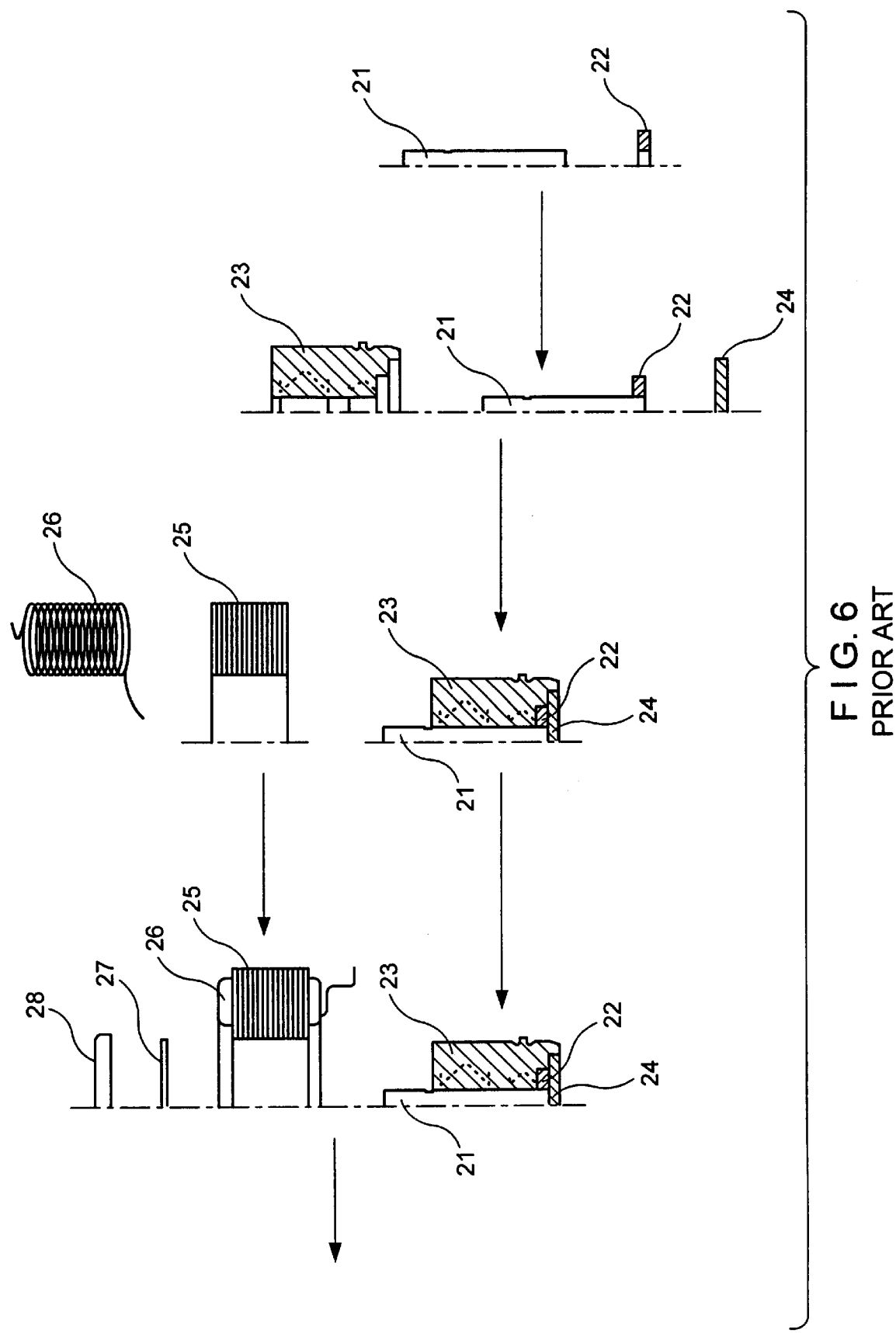
FIGS. 6–7 show a cross section of a dynamic pressure bearing apparatus according to the present invention. indicating a process of a method for manufacturing thereof.
Figure 7:
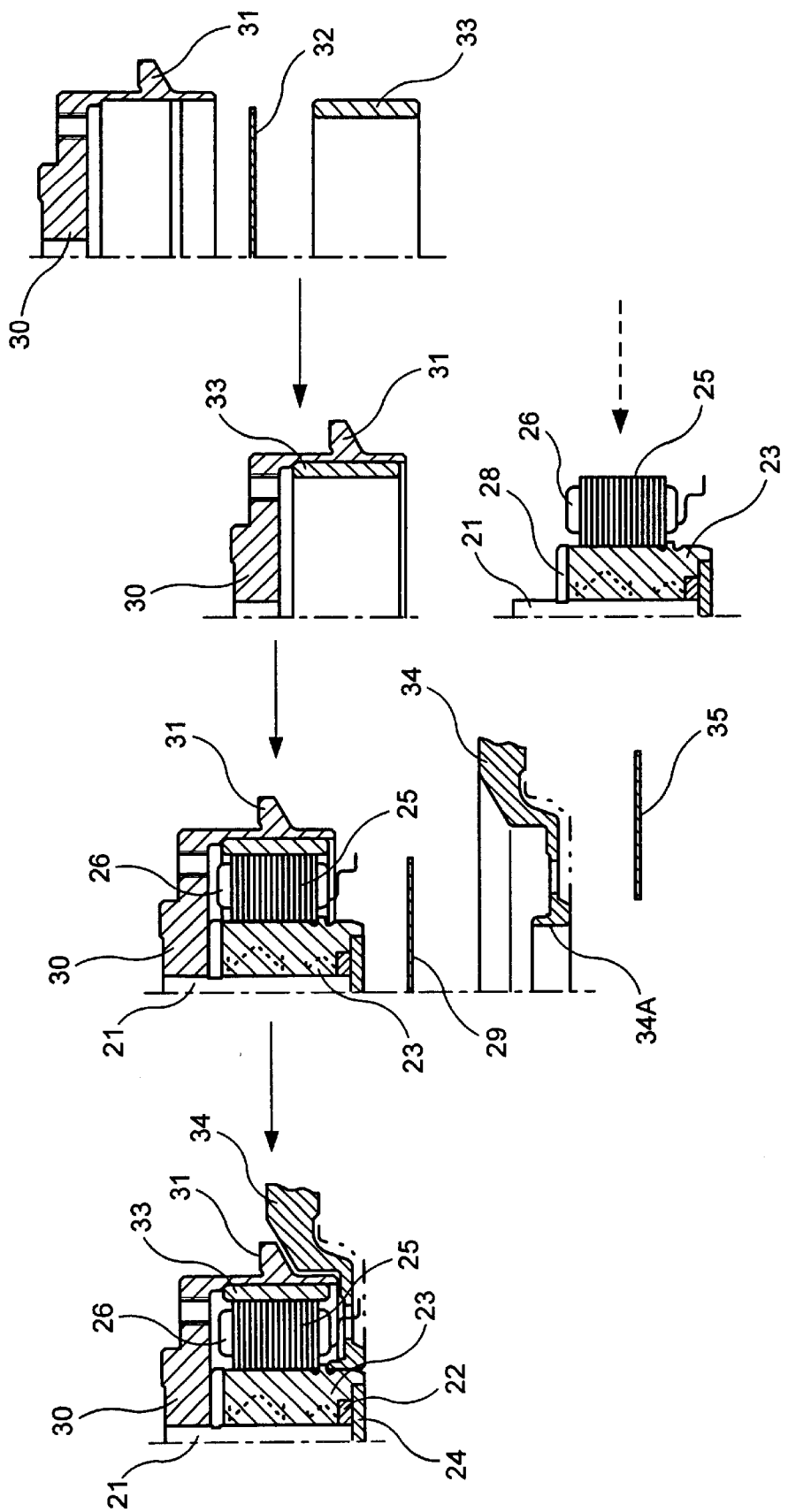

FIG. 5 shows an enlarged view of a motor for a disk drive obtained by the above method. In the example shown in FIG. 5, however, an equivalent to boss 9 is integrally formed on base 8, instead of forming boss 9 as an individual part in the previous description. In FIG. 5, hub 2, to which a disk is mounted, is fixed to rotatable shaft 1 in advance by press fitting center hole 2A of hub 2 to the top end of rotatable shaft 1. Rotatable shaft 1 is inserted in center hole 4A of sleeve 4, which has openings on the both ends, as described in relation to FIG. 1. A radial dynamic pressure bearing 40 is formed between rotatable shaft 1 and sleeve 4 wherein rotatable shaft 1 is rotatably supported by the dynamic pressure effect of the dynamic pressure bearing. Thrust dynamic pressure bearing 41 is formed between thrust plate 5, press fitted to the bottom end of rotatable shaft 1, and counter plate 6, placed at the bottom opening of sleeve 4 as a lid to seal thereat, and between thrust plate 5 and the facing surface of sleeve 4 to support the thrust load.

The center hole of laminated core 12 is fixed around sleeve 4 from the bottom side; further, sleeve 4 is fixed to base 8 by press fitting its outside of the lower end to the center hole of base 8. A given space is established between upper surface 4D of sleeve 4 and facing lower surface 17 of hub 2; this space is larger than the bearing space of dynamic pressure bearing 40. In addition, lower surface 17 of hub 2, facing upper surface 4D of sleeve 4, is formed to be smoothly tapered; the distance between lower surface 17 of hub 2 and upper surface 4D of sleeve 4 is gradually increased towards the outside of the radius in relation to dynamic pressure bearing 40. Also, upper end 4E at the center hole of sleeve 4 is tapered; space 18, with a wedge-shaped cross section, is formed between [upper end 4E and] the outer surface of rotatable shaft 1. Space 18 becomes wider towards the top and connects to the space forming the dynamic pressure bearing and the space between hub 2 and upper surface 4D of sleeve 4.

Oil absorbent member 16, to absorb oil leaked from the space between hub 2 and sleeve 4, is attached to the inner ceiling of hub 2. Oil absorbent member 16 is supported by cover plate which is fixed to the inner ceiling of hub 2. Cover plate 15 is shaped as an approximate disc; its inner end surface faces the outer surface at the top end of sleeve 4 with a small space. Round oil absorbent member 16 is attached to the top of cover plate 15; the inner end surface of oil absorbent member 16 faces the space between lower surface 17 of hub 2 and upper surface 4D of sleeve 4.

Upper surface 4D of sleeve 4 and facing lower surface 17 of hub 2, as well as cover plate 15 and facing outer surface at the top end of sleeve 4, are separately treated for oil removal.

According to the embodiment shown in FIG. 5 as described above, the space between lower surface 17 of hub 2 and upper surface 4D of sleeve 4 is larger than the bearing space of the dynamic pressure bearing. The oil can be readily inserted from this relatively large space into the dynamic pressure bearing. Additionally, the space between lower surface 17 of hub 2 and upper surface 4D of sleeve 4 widens towards the outside of the radius in relation to the side of the dynamic pressure bearing. Therefore, cleaning thereat after insertion of the oil is easy. Further, upper surface 4D of sleeve 4 and facing lower surface 17 of hub 2 are treated for oil removal; hence, cleaning of the oil is made easy.

The inner end surface of cover plate 15 faces the outer surface at the top end of sleeve 4 with a small space. Even though the oil leaks from the space between lower surface 17 of hub 2, it will be trapped in the small space such that no further leakage will occur. This provides high reliability as a dynamic pressure bearing apparatus applied to a disk drive apparatus.

Moreover, cover plate 15 and facing outer surface at the top end of sleeve 4 are treated for oil removal; therefore, oil leakage can be prevented thereby.

In addition, oil absorbent member 16 is attached to hub 2, facing the space between lower surface 17 of hub 2 and upper surface 4D of sleeve 4. Even though, the leaked oil is spattered towards the outside of the radius by centrifugal force, the oil can be captured by oil absorbent member 16.

While the present invention has been particularly shown and described in conjunction with preferred embodiments thereof, it will be readily appreciated by those of ordinary skill in the art that various changes may be made without departing from the spirit and scope of the invention.

Therefore, it is intended that the appended claims be interpreted as including the embodiments described herein, the alternatives mentioned above, and all equivalents thereto.

What is claimed is:

1. A method for manufacturing a dynamic pressure bearing apparatus having a rotatable shaft to which a hub is mounted and a disk fixed to said hub, a sleeve which supports said rotatable shaft, and a dynamic pressure bearing formed between said rotatable shaft and said sleeve, said rotatable shaft being rotatably supported by said dynamic pressure bearing, said method comprising the steps of:
   before said rotatable shaft is assembled onto said sleeve, integrating said hub and said rotatable shaft by fixing said hub and shaft to each other;
   processing the disk mounting surface of said hub after the integrating step, such that relative accuracy between said rotatable shaft and said disk mounting surface can be obtained;
   and subsequently assembling said rotatable shaft to said sleeve.

2. The method for manufacturing a dynamic pressure bearing apparatus according to claim 1, wherein said disk mounting surface, before said hub is fixed to said rotatable shaft, has extra thickness for a cutting process.

3. The method for manufacturing a dynamic pressure bearing apparatus according to claim 2, wherein said dynamic pressure bearing employs oil as a lubricant fluid and said oil is poured between said sleeve and said rotatable shaft after said rotatable shaft is assembled to said sleeve.

4. The method for manufacturing a dynamic pressure bearing apparatus according claim 3, wherein an end of said rotatable shaft opposite from the end to which said hub is fixed is inserted through one of the openings at both ends of said sleeve, followed by fixing of a thrust plate to said end of said rotatable shaft from the other opening of said sleeve; and then, said other opening is closed by covering it with a lid, followed by pouring said oil through a space between the end surface of said sleeve at said other opening and said hub.

5. The method for manufacturing a dynamic pressure bearing apparatus according to claim 4, wherein a distance between said end surface of said sleeve and said hub, through which said oil is poured, is larger than the bearing gap of said dynamic pressure bearing and is formed to be larger on its outside than the distance between the end surface of said sleeve on the side of said dynamic pressure bearing and the facing surface of said hub.

6. The method for manufacturing a dynamic pressure bearing apparatus according to claim 3, wherein said surface of said hub facing said end of said sleeve has an oil absorbent which absorbs said oil leaking from a space between said hub and said sleeve.

7. The method for manufacturing a dynamic pressure bearing apparatus according to claim 1, wherein radial dynamic pressure generating grooves are formed on at least one of the inner surface of said sleeve and the outer surface of said rotatable shaft; said dynamic pressure generating grooves are formed before said rotatable shaft is inserted in the center hole of said sleeve; and said disk mounting surface, before said hub is fixed to said rotatable shaft, has extra thickness for a cutting process.

8. The method for manufacturing a dynamic pressure bearing apparatus according to claim 7, wherein said dynamic pressure bearing employs oil as a lubricant fluid and said oil is poured between said sleeve and said rotatable shaft after said rotatable shaft is inserted into said center hole of said sleeve.

9. The method for manufacturing a dynamic pressure bearing apparatus according to claim 8, wherein said rotatable shaft is inserted through one end of said center hole of said sleeve, followed by fixing of a thrust plate for generating thrust dynamic pressure to said rotatable shaft from the other end of said center hole of said sleeve; and then, a lid is placed on said sleeve to close said other end of said sleeve, followed by pouring said oil through a space between the end surface of said sleeve and said hub.

10. The method for manufacturing a dynamic pressure bearing apparatus according to claim 9, wherein an upper thrust dynamic pressure bearing is formed with the upper surface of said thrust plate and the surface of said sleeve facing said thrust plate while a lower thrust dynamic pressure bearing is formed with the lower surface of said thrust plate and said lid.

* * * * *